US011881746B2

(12) United States Patent
Lin et al.

(10) Patent No.: US 11,881,746 B2
(45) Date of Patent: Jan. 23, 2024

(54) ROTOR AND MOTOR HAVING ROTOR

(71) Applicant: NIDEC CORPORATION, Kyoto (JP)

(72) Inventors: Hsin-Nan Lin, Taipei (TW); Sheng-Chan Yen, Taipei (TW); Ta-Yin Luo, Taipei (TW); Guo-Jhih Yan, Taipei (TW); Yu-Wei Hsu, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 387 days.

(21) Appl. No.: 17/270,842

(22) PCT Filed: Sep. 3, 2019

(86) PCT No.: PCT/JP2019/034654
§ 371 (c)(1),
(2) Date: Feb. 23, 2021

(87) PCT Pub. No.: WO2020/050280
PCT Pub. Date: Mar. 12, 2020

(65) Prior Publication Data
US 2021/0211001 A1 Jul. 8, 2021

(30) Foreign Application Priority Data
Sep. 5, 2018 (CN) .......................... 201811030075.9

(51) Int. Cl.
*H02K 1/24* (2006.01)
*H02K 1/02* (2006.01)
*H02K 1/28* (2006.01)

(52) U.S. Cl.
CPC ............... *H02K 1/246* (2013.01); *H02K 1/02* (2013.01); *H02K 1/28* (2013.01); *H02K 2213/03* (2013.01)

(58) Field of Classification Search
CPC ............ H02K 1/246; H02K 1/02; H02K 1/28; H02K 2213/03; H02K 1/265; H02K 17/165; H02K 17/26; H02K 19/14; H02K 1/22
See application file for complete search history.

(56) References Cited

U.S. PATENT DOCUMENTS 6,900,571 B2 5/2005 Yoshino et al.
6,906,448 B2 6/2005 Yoshino et al.
(Continued)

FOREIGN PATENT DOCUMENTS

GB 1305069 A 1/1973
JP 2001231230 A 8/2001
(Continued)

OTHER PUBLICATIONS

International Search Report in PCT/JP2019/034654, dated Nov. 26, 2019. 2pp.

*Primary Examiner* — Thomas Truong
(74) *Attorney, Agent, or Firm* — HAUPTMAN HAM, LLP

(57) ABSTRACT

An embodiment of the present invention provides a rotor and a motor having the rotor. By providing a plurality of flux barrier groups and slot groups at intervals in a circumferential direction of the rotor iron core, it is possible to flexibly arrange the numbers of the flux barrier groups and the slot groups so as to meet the requirements for the number of poles of different products. In addition, by flexibly adjusting the quantity ratio between the flux barrier groups and the slot groups and/or the quantity relationship between the flux barriers in the flux barrier group and the slots in the slot group, it is possible to meet the requirements for motor efficiency and starting capacity of different products. Further, since the processing jig of the rotor only requires (Continued)

processing of the structures of the flux barriers and the slots, the manufacturing cost can be reduced.

14 Claims, 2 Drawing Sheets

(56) References Cited

U.S. PATENT DOCUMENTS

| | | |
|---|---|---|
| 10,411,537 B2 | 9/2019 | Desai et al. |
| 2003/0090170 A1* | 5/2003 | Yoshino ................ H02K 1/246 |
| | | 310/216.094 |
| 2003/0111927 A1 | 6/2003 | Takita et al. |
| 2010/0148613 A1* | 6/2010 | Nam ...................... H02K 21/46 |
| | | 310/156.83 |
| 2012/0274168 A1 | 11/2012 | Holzner et al. |
| 2013/0015727 A1* | 1/2013 | Iki ......................... H02K 1/246 |
| | | 310/49.43 |
| 2019/0199150 A1 | 6/2019 | Cesa et al. |

FOREIGN PATENT DOCUMENTS

| | | |
|---|---|---|
| JP | 2003259615 A | 9/2003 |
| JP | 2006121765 A | 5/2006 |
| JP | 200977458 A | 4/2009 |
| JP | 2012244783 A | 12/2012 |

\* cited by examiner

ROTOR AND MOTOR HAVING ROTOR

CROSS-REFERENCE TO RELATED APPLICATIONS

This is the U.S. national stage of application No. PCT/JP2019/034654, filed on Sep. 3, 2019, and priority under 35 U.S.C. § 119 (a) and 35 U.S.C. § 365(b) is claimed from Chinese Patent Application No. 201811030075.9, filed on Sep. 5, 2018.

FIELD OF THE INVENTION

The present invention relates to the electromechanical field, and in particular, to a rotor and a motor having the rotor.

BACKGROUND

In the use of motors, motors that do not require a controller and are directly connected and started by electric power currently have a high market share. Most of the motor types are conventional induction motors, but the efficiency of induction motors is generally at the IE3 efficiency level. To raise it to the IE4 efficiency level, it is imperative to use high quality materials in order to reduce the motor loss and further increase the efficiency, but high material costs must be paid. Most of the motors that reach IE4 level or higher efficiency in the current market are permanent magnet synchronous motors or synchronous reluctance motors, but all of the motors of the above-mentioned types must adopt a closed loop drive controller.

In recent years, new motors replacing the motors of the above-mentioned types are gradually appearing, and self-start synchronous reluctance motor (Line start SynRM) is one of them. Such motors have self-starting ability of induction motors, and the efficiency of steady operation can reach the IE4 efficiency levels, similar to synchronous reluctance motors. Currently, self-starting synchronous reluctance motors are mainly divided into two types, that is, one in which a flux barrier is provided to the rotor of an existing induction motor, and one in which aluminum casting is directly made in a flux barrier of the rotor of a synchronous reluctance motor, and the rotor is also equipped with a cage conductor.

The introduction of the above technical background is only for the purpose of making it easy to explain the technical measures of the present invention clearly and completely. It should be noted that it is described so as to allow those skilled in the art to understand easily. Since these measures are described only in the background technical part of the present invention, it cannot be said that the above technical measures are known to those skilled in the art.

However, for a motor in which a flux barrier is provided to the rotor of an existing induction motor, since it is a structural modification of an existing induction motor, the torque component generated by the structure of the reluctance motor is small and the motor efficiency cannot be increased too much. Therefore, the rotation speed may not reach the synchronous speed at the rated efficiency. For a motor that is aluminum-casted directly in the flux barrier of the rotor of a synchronous reluctance motor, when the steady operation is at the synchronous rotation speed, the magnetic field mainly passes through a path other than the flux barrier in the rotor. Therefore, the magnetic field caused by the rotor conductor is reduced, and the loss caused by the rotor conductor is greatly reduced as compared with the conventional self-starting synchronous reluctance motor, whereby the efficiency of the entire motor is reduced.

SUMMARY

According to an exemplary embodiment of the present invention, a rotor is provided. The rotor includes a rotor iron core including electrical steel sheets that are layered in an axial direction and rotate around a center axis. The rotor iron core includes at least two flux barrier groups and at least two slot groups penetrating the electrical steel sheets in the axial direction, the flux barrier group includes at least two flux barriers, and the slot group includes at least two slots. The at least two flux barrier groups and the at least two slot groups are provided at intervals in a circumferential direction of the rotor iron core.

According to an exemplary embodiment of the present invention, a number of the flux barrier groups is same as a number of the slot groups, or the number of the flux barrier groups is larger than the number of the slot groups.

According to an exemplary embodiment of the present invention, the number of the flux barrier groups is n times the number of the slot groups, and n is an integer greater than 1.

According to an exemplary embodiment of the present invention, the number of the flux barrier groups is two, and the number of the slot groups is two, the number of the flux barrier groups is four, and the number of the slot groups is two, the number of the flux barrier groups is three, and the number of the slot groups is three, the number of the flux barrier groups is six, and the number of the slot groups is two, or the number of the flux barrier groups is four, and the number of the slot groups is four.

According to an exemplary embodiment of the present invention, when the number of the flux barrier groups and the number of the slot groups are the same, the flux barrier groups and the slot groups are provided at intervals from each other.

According to an exemplary embodiment of the present invention, when the number of the flux barrier groups is larger than the number of the slot groups, an interval between the at least two slot groups in the circumferential direction of the rotor iron core has at least two flux barrier groups.

According to an exemplary embodiment of the present invention, the at least two flux barrier groups and the at least two slot groups are provided at equal intervals in the circumferential direction of the rotor iron core.

According to an exemplary embodiment of the present invention, a number of slots in each of the slot groups is larger than the number of flux barriers in each of the flux barrier groups.

According to an exemplary embodiment of the present invention, each of the flux barrier groups has at least two arc-shaped flux barriers, and each of the arc-shaped flux barriers is curved outward in a radial direction of the rotor iron core.

According to an exemplary embodiment of the present invention, a width of each of the arc-shaped flux barriers is same, or the width of each of the arc-shaped flux barriers gradually decreases from a radially outer side to a radially inner side of the rotor iron core.

According to an exemplary embodiment of the present invention, one or both of each of the flux barriers and each of the slots is filled with a conductive non-magnetic material.

According to an exemplary embodiment of the present invention, a magnet is inserted in each of the flux barriers.

According to an exemplary embodiment of the present invention, a motor having the rotor according to any one of the first aspect to the twelfth aspect of the embodiment of the present invention is provided.

An embodiment of the present invention is disclosed in detail with reference to the description and drawings of the following sentences. It should be understood that the scope of the embodiment of the present invention is not limited to this. Within the spirit of the appended claims and the covenant, the embodiment of the present invention includes many changes, modifications and equivalents.

For one embodiment, the features described and/or shown may be used in one or more other embodiments in the same or similar manner, may be combined with features of other embodiments, or may be replaced with other implementation features.

The term "provide/include/have", when used in the text, refers to the presence of a feature, the whole, or a member, and does not exclude the presence or addition of one or more other features, whole, or members.

The above and other elements, features, steps, characteristics and advantages of the present disclosure will become more apparent from the following detailed description of the preferred embodiments with reference to the attached drawings.

DETAILED DESCRIPTION

With reference to the drawings, the above and other features of the present invention will be clear. In the specification and the drawings, a specific embodiment of the present invention is specifically disclosed, and an embodiment in which the principles of the present invention can be adopted is shown. It should be understood that the present invention is not limited to the described embodiment, but includes all modifications and changes and equivalents that fall within the scope of the appended claims.

In the present invention, a direction parallel to a direction in which the center axis extends is referred to as an "axial direction", a radial direction centered on the center axis is referred to as a "radial direction", and a circumferential direction around the center axis is referred to as a "circumferential direction". It should be noted that the definitions of the respective directions of the present invention are for the sake of facilitating the description of the embodiment of the present invention, and do not limit the directions in which the rotor and motor are used and manufactured.

A rotor and a motor of an embodiment of the present invention will be described below.

According to an embodiment of the present invention, a rotor and a motor having a rotor can be provided.

Figure 1:
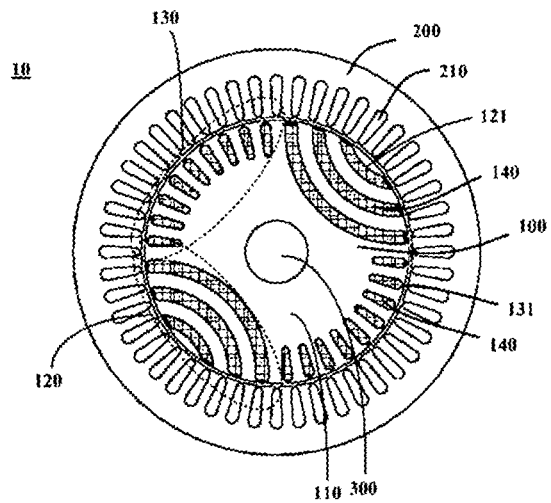
FIG. 1 is a cross-sectional structural view of a motor of an embodiment of the present invention.

FIG. 1 is a cross-sectional structural view of a motor of the embodiment of the present invention. As shown in FIG. 1, a motor 10 includes a rotor 100. The motor 10 further includes a stator 200 and a rotary shaft 300. The stator 200, the rotor 100, and the rotary shaft 300 are provided in this order from the outside to the inside in the radial direction.

In this embodiment, the stator 200 may have a conventional structure. For example, as shown in FIG. 1, a plurality of cogging structures 210 are provided in the circumferential direction of the stator 200.

Hereinafter, the structure of the rotor 100 will be specifically described.

As shown in FIG. 1, the rotor 100 has a rotor iron core 110. The rotor iron core 110 is configured of electromagnetic steel plates that are layered in the axial direction and rotate about the center axis.

The rotor iron core 110 has at least two flux barrier groups 120 and at least two slot groups 130 penetrating the electromagnetic steel plates in the axial direction. The flux barrier group 120 has at least two flux barriers 121, and the slot group 130 has at least two slots 131. At least two flux barrier groups 120 and at least two slot groups 130 are spaced apart in the circumferential direction of the rotor iron core 110.

As shown in FIG. 1, one flux barrier group 120 and one slot group 130 have flux barriers and slots in regions separated by dashed lines, respectively.

In the present embodiment, the flux barrier group 120 includes at least two flux barriers 121, and the slot group 130 includes at least two slots 131.

The rotor 100 may further have a rotary shaft hole located at the center of the rotor iron core 110 so that the rotary shaft 300 can pass through.

In the present embodiment, each of the number of flux barrier groups and the number of slot groups is at least two. The specific number of each group may be set based on actual requirements. The sum of the number of flux barrier groups and the number of slot groups may be the same as the number of poles of the motor.

Figure 2:
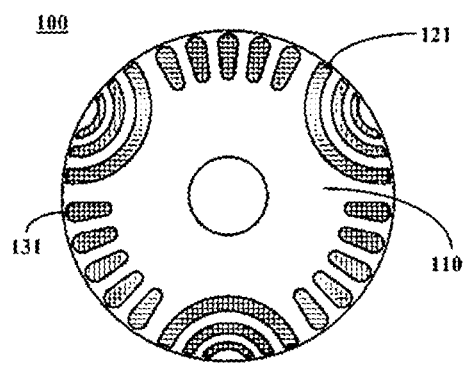
FIG. 2 is a cross-sectional structural view of a 6-pole rotor of the embodiment of the present invention.
Figure 3:
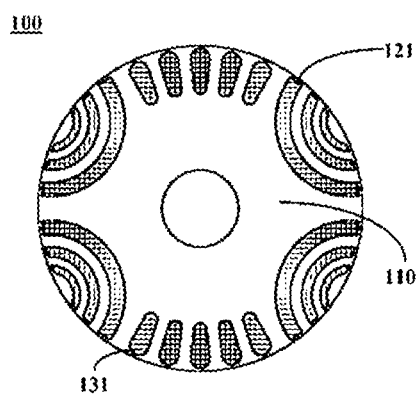
FIG. 3 is another cross-sectional structural view of the 6-pole rotor of the embodiment of the present invention.

For example, description will be given on the case where the number of poles of the motor is six. FIG. 2 is a cross-sectional structural view of a 6-pole rotor of the embodiment of the present invention, and FIG. 3 is another cross-sectional structural view of the 6-pole rotor of the embodiment of the present invention. As shown in FIG. 2, each of the flux barrier groups 120 and the slot groups 130 is set to be three groups. As shown in FIG. 3, the flux barrier groups 120 may be set to be four groups, and the slot groups 130 may be set to be two groups.

Figure 4:
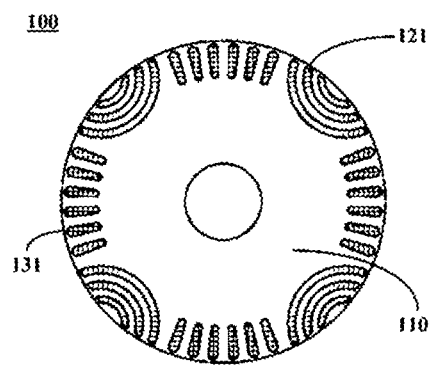
FIG. 4 is a cross-sectional structural view of an 8-pole rotor of the embodiment of the present invention.
Figure 5:
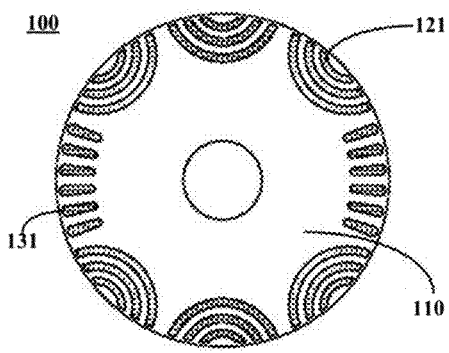
FIG. 5 is another cross-sectional structural view of the 8-pole rotor of the embodiment of the present invention.

For example, description will be given on the case where the number of poles of the motor is eight. FIG. 4 is a cross-sectional structural view of an 8-pole rotor of the embodiment of the present invention, and FIG. 5 is another cross-sectional structural view of the 8-pole rotor of the embodiment of the present invention. As shown in FIG. 4, each of the flux barrier groups 120 and the slot groups 130 is set to be four groups. That is, as shown in FIG. 5, the flux barrier groups 120 may be set to be six groups, and the slot groups 130 may be set to be two groups.

In the present embodiment, the quantity ratio of the flux barrier groups and the slot groups may be set based on the product requirements.

In the present embodiment, when the requirements for motor efficiency and starting capacity basically match, the number of flux barrier groups and the number of slot groups may be set to be the same.

For example, as shown in FIG. 1, the number of poles of the motor is four, the flux barrier groups 120 is set to be two groups, and the slot groups 130 is set to be two groups.

Further, for example, the number of poles of the motor is six, and as shown in FIG. 2, each of the flux barrier groups 120 and the slot groups 130 is set to be three groups.

Alternatively, for example, the number of poles of the motor is eight, and as shown in FIG. 4, each of the flux barrier groups 120 and the slot groups 130 is set to be four groups.

In that case, as shown in FIGS. 1, 2, and 4, the flux barrier groups 120 and the slot groups 130 may be provided at intervals from each other, that is, they may be provided alternatively at intervals.

In the present embodiment, when the demand for motor efficiency is high, the number of flux barrier groups may be set larger than the number of slot groups.

For example, the number of flux barrier groups is set to n times the number of slot groups. Here, n is an integer greater than 1. For example, the number of poles of the motor is six, and as shown in FIG. 3, the number of flux barrier groups 120 is four, and the number of slot groups 130 is two. Alternatively, for example, the number of poles of the motor is eight, and as shown in FIG. 5, the number of flux barrier groups 120 is six, and the number of slot groups 130 is two.

In that case, as shown in FIGS. 3 and 5, the spacing between the two slot groups 130 in the circumferential direction of the rotor iron core has at least two flux barrier groups 120.

Further, when the demand for starting ability of the motor is high, the number of slots groups may be set larger than the number of flux barrier groups. In that case, the spacing between at least two flux barrier groups in the circumferential direction of the rotor iron core has at least two slot groups.

In the present embodiment, the at least two flux barrier groups 120 and the at least two slot groups 130 may be provided at equal intervals in the circumferential direction of the rotor iron core. As described above, the present invention is convenient for manufacturing the motor. Further, the stability of the motor performance can be guaranteed.

However, for a motor with specific requirements, the spacing between the at least two flux barrier groups 120 and the at least two slot groups 130 may not be set exactly the same.

In the present embodiment, the number of flux barriers in each flux barrier group may be the same, and the number of slots in each slot group may be the same. As described above, the present invention is convenient for manufacturing the motor. Further, the stability of the motor performance can be guaranteed.

However, for a motor with specific requirements, the number of flux barriers in each flux barrier group may be different, or the number of flux barriers in some groups may be different, and/or the number of slots in each slot group may be different or the number of slots in some groups may be different.

In the present embodiment, the number of flux barriers in a flux barrier group and the number of slots in a slot group can also be set based on the product requirements.

For example, the number of slots in a slot group can be made larger than the number of flux barriers in a flux barrier group, and thus the starting ability of the motor can be improved.

For example, as shown in FIG. 1, the number of slots 131 in each slot group 130 is nine, and the number of flux barriers 121 in each flux barrier group 120 is three.

For example, as shown in FIGS. 2 and 3, the number of slots 131 in each slot group 130 is five, and the number of flux barriers 121 in each flux barrier group 120 is three.

For example, as shown in FIGS. 4 and 5, the number of slots 131 in each slot group 130 is six, and the number of flux barriers 121 in each flux barrier group 120 is three.

In the present embodiment, the shape of each flux barrier in a flux barrier group and the shape and size of each slot in a slot group may be set based on actual requirements.

For example, as shown in FIGS. 1 to 5, each flux barrier 121 may be designed in an arc shape, and curved outward in the radial direction of the rotor iron core. With respect to one flux barrier group 120, the length of the arc on the radially outer side facing the rotor iron core of each flux barrier 121 gradually decreases, and the arc-shaped flux barriers 121 may be provided substantially parallel to each other.

In the present embodiment, the width of each arc-shaped flux barrier 121 may be the same, and the width of each arc-shaped flux barrier 121 may gradually decrease from the radially outer side to the radially inner side of the rotor iron core 110.

Further, the flux barrier 121 of the present embodiment does not have to be designed in an arc shape. For example, it may be designed in a structure composed of a polygonal line similar to the locus of the arc shape, or it may be designed in a structure composed of an arc shape and a polygonal line.

In the present embodiment, as shown in FIGS. 2 to 5 for example, each slot 131 may be designed in a rod shape in which one end of the rotor iron core 110 facing radially inward is narrower with respect to one end facing radially outward. In this way, the passage path of the magnetic induction wire can be effectively guided.

In the present embodiment, respective flux barriers in the same flux barrier group may be designed to have the same shape and/or size, or may be designed to be partially the same or different based on the requirements. Also, respective flux barriers in different flux barrier groups may be designed to be partially the same or different based on the requirements.

Similarly, respective slots in the same slot group may be designed to have the same shape and/or size, or may be designed to be partially the same or different based on the requirements. Also, respective slots in different slot groups may be designed to be partially the same or different based on the requirements.

In the present embodiment, each flux barrier and/or slot may be filled with a conductive non-magnetic material, for example, aluminum or copper. In this way, the motor can self-start.

For example, as shown in FIG. 1, each flux barrier 121 and each slot 131 is filled with a conductive non-magnetic material 140.

In the present embodiment, each flux barrier 121 may not be filled with the conductive non-magnetic material 140, and instead, a magnet can be inserted into each flux barrier 121 to increase the motor efficiency in this way.

As can be seen from the present embodiment described above, by providing a plurality of flux barrier groups and slot groups at intervals in the circumferential direction of the rotor iron core, it is possible to flexibly arrange the number of flux barrier groups and the number of slot groups so as to satisfy the requirements for the number of poles of different products. Moreover, by flexibly adjusting at least one of the quantity ratio between the flux barrier groups and the slot groups, the quantity relationship between the flux barriers in the flux barrier group and the slots in the slot group, the arrangement positions of the flux barrier groups and the slot groups, and the size of the flux barrier in the flux barrier group and the size of the slot in the slot group, it is possible to meet the requirements for the motor efficiency and for the start-up capacity of different products. Further, since the processing jig of the rotor only requires processing of the structures of the flux barriers and the slots, the manufacturing cost can be reduced.

The embodiment of the present invention has been described in detail with reference to the drawings, and the method in which the principle of the present invention is adopted has been described. However, embodiment of the present invention is not limited to the above embodiment. All changes, modifications, and equivalents within the scope of the gist of the present invention are included.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a rotor iron core including electrical steel sheets that are layered in an axial direction, the rotor iron core configured to rotate about a center axis, wherein
the rotor iron core includes
at least two flux barrier groups, and
at least two slot groups penetrating the electrical steel sheets in the axial direction,
each of the at least two flux barrier groups includes at least two flux barriers,
each of the at least two slot groups includes at least two slots,
each flux barrier of the at least two flux barriers has an elongated shape on a cross-section of the rotor iron core, the cross-section being perpendicular to the axial direction, two ends of said each flux barrier being closer to a circumferential surface of the rotor than an intermediate portion of said each flux barrier,
each slot of the at least two slots has an elongated shape, only one end of said each slot being adjacent to the circumferential surface of the rotor, and the other end of said each slot being more distant from the circumferential surface than the one end of said each slot,
the at least two flux barrier groups and the at least two slot groups are provided at intervals in a circumferential direction of the rotor iron core,
said each of the at least two slot groups is a group of two or more slots arranged consecutively along the circumferential direction without being intervened by a flux barrier group of the at least two flux barrier groups,
said each of the at least two flux barrier groups is a group of two or more flux barriers arranged consecutively along the circumferential direction without being intervened by a slot group of the at least two slot groups, one flux barrier of the two or more flux barriers of the flux barrier group being accompanied by at least one other flux barrier that belongs to the flux barrier group, the one flux barrier extending along the at least one other flux barrier from one end to the other end of the at least one other flux barrier, and
a number of the at least two flux barrier groups is larger than a number of the at least two slot groups.

2. The rotor according to claim 1, wherein
the number of the at least two flux barrier groups is n times the number of the at least two slot groups, and n is an integer greater than 1.

3. The rotor according to claim 1, wherein
the number of the at least two flux barrier groups is four, and the number of the at least two slot groups is two, or
the number of the at least two flux barrier groups is six, and the number of the at least two slot groups is two.

4. The rotor according to claim 1, wherein between the at least two slot groups in the circumferential direction of the rotor iron core the at least two flux barrier groups are arranged.

5. The rotor according to claim 1, wherein
a number of slots in said each of the at least two slot groups is larger than a number of flux barriers in said each of the at least two flux barrier groups.

6. The rotor according to claim 1, wherein
said each of the at least two flux barrier groups includes at least two arc-shaped flux barriers, and
said each of the at least two arc-shaped flux barriers is curved outward in a radial direction of the rotor iron core.

7. The rotor according to claim 6, wherein
widths of the at least two arc-shaped flux barriers gradually increase from a radially outer side to a radially inner side of the rotor iron core.

8. The rotor according to claim 6, wherein
the at least two arc-shaped flux barriers have a same width.

9. The rotor according to claim 1, wherein
at least one of (i) the at least two flux barriers or (ii) the at least two slots is filled with a conductive non-magnetic material.

10. The rotor according to claim 1, wherein
a magnet is inserted in said each of the at least two flux barriers.

11. A motor comprising the rotor according to claim 1.

12. A rotor, comprising:
a rotor iron core including electrical steel sheets that are layered in an axial direction, the rotor iron core configured to rotate about a center axis, wherein the rotor iron core includes
a plurality of flux barrier groups, wherein each of the plurality of flux barrier groups includes a plurality of flux barriers, each flux barrier of the plurality of flux barriers has an elongated shape on a cross-section of the rotor iron core, the cross-section being perpendicular to the axial direction, and two ends of said each flux barrier is closer to a circumferential surface of the rotor than an intermediate portion of said each flux barrier, and
a plurality of slot groups penetrating the electrical steel sheets in the axial direction, wherein each of the plurality of slot groups includes a plurality of slots, each slot of the plurality of slots has an elongated shape, only one end of said each slot is adjacent to the circumferential surface of the rotor, and the other end of said each slot is more distant from the circumferential surface than the one end of said each slot, wherein
the plurality of flux barrier groups and the plurality of slot groups are provided at intervals in a circumferential direction of the rotor iron core,
all flux barriers overlapping each other between the center axis and a point on the circumferential surface of the rotor in a radial direction of the rotor iron core belong to one of the plurality of flux barrier groups, all slots arranged consecutively along the circumferential direction without being intervened by a flux barrier group of the plurality of flux barrier groups belong to one of the plurality of slot groups, and a number of the plurality of flux barrier groups is larger than that of the plurality of slot groups.

13. The rotor according to claim 12, wherein said each flux barrier is an arc-shaped flux barrier curved toward the center axis.

14. The rotor according to claim 13, wherein widths of the plurality of flux barriers in each of the plurality of flux barrier groups gradually increase from a radially outer side to a radially inner side of the rotor iron core.

* * * * *